Dec. 24, 1929.  D. H. YOUNG  1,740,557
TOOTHED IMPLEMENT
Filed July 19, 1927  2 Sheets-Sheet 2

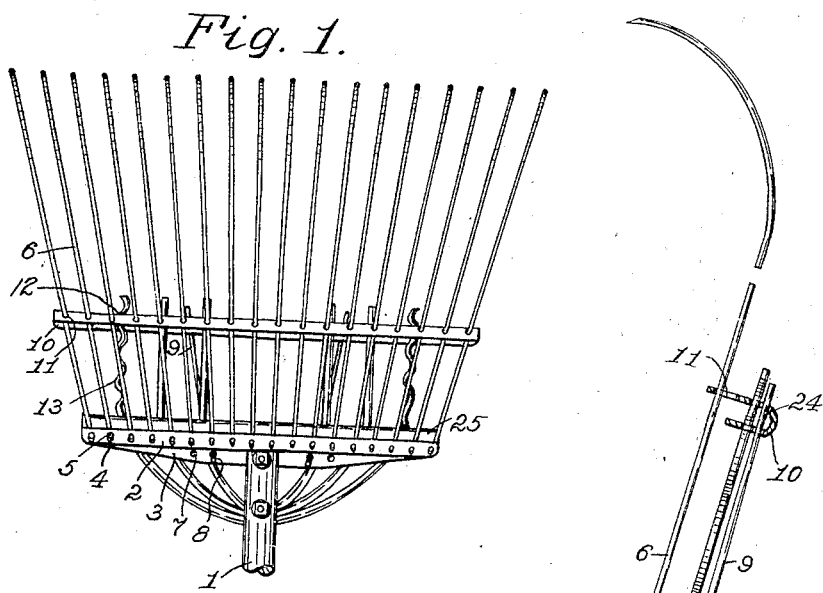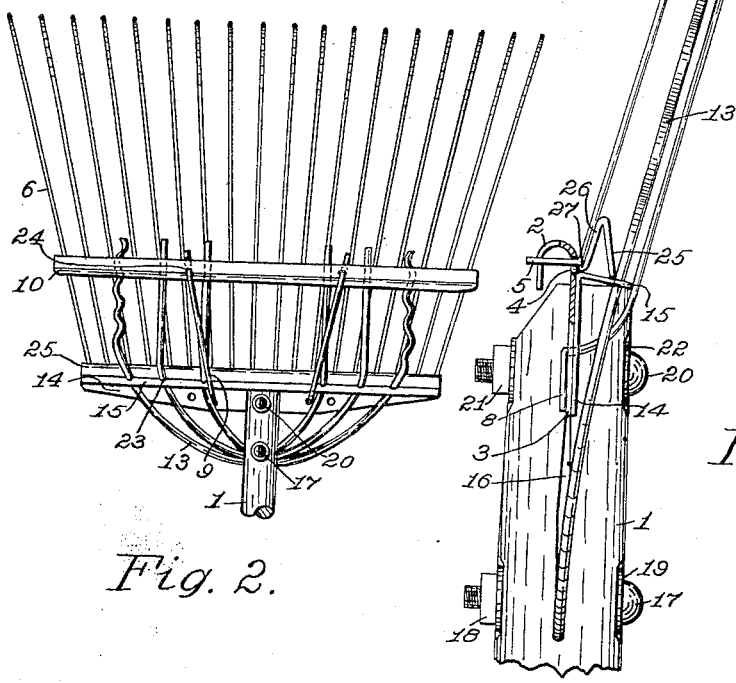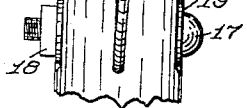

Inventor
D. H. Young
By G. C. Kennedy
Attorney

Patented Dec. 24, 1929

1,740,557

UNITED STATES PATENT OFFICE

DANIEL H. YOUNG, OF MANCHESTER, IOWA

TOOTHED IMPLEMENT

Application filed July 19, 1927. Serial No. 206,931.

My invention relates to improvements in toothed implements, and the object of my improvement is to provide a device of this class with detachably mounted tines, and to otherwise improve such implements in the matter of effectively supporting and adjustably spacing the tines thereof.

This object I have accomplished by the means which are hereinafter described and claimed, and which are illustrated in the annexed drawings, in which similar numerals denote similar parts throughout the several views.

Figure 4:
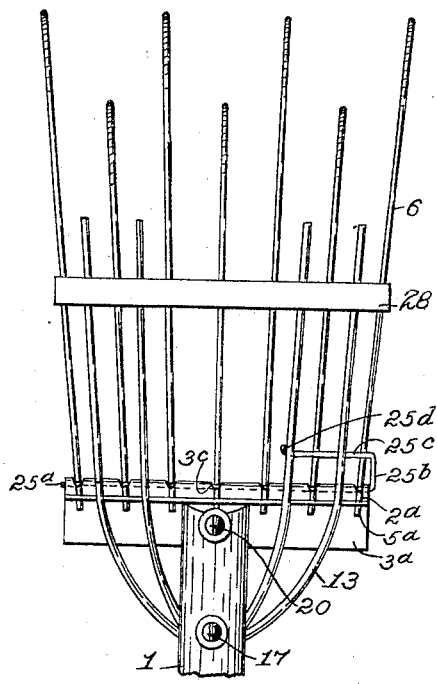
Figure 6:
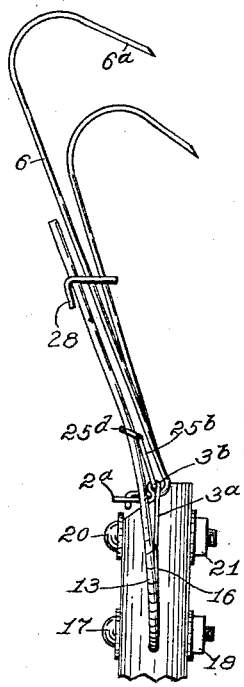
Figure 5:
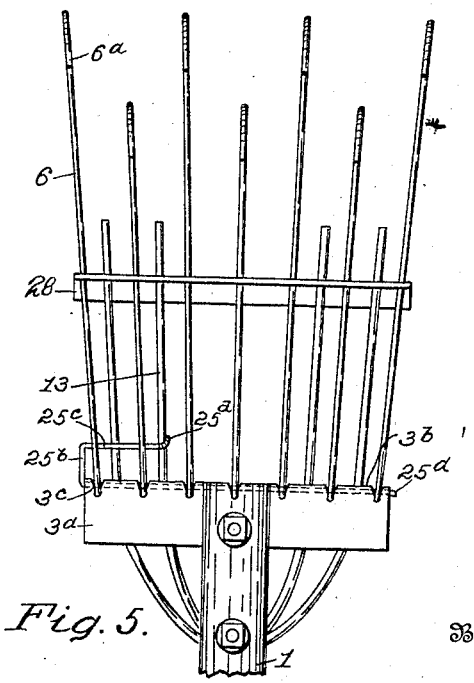
Figure 7:
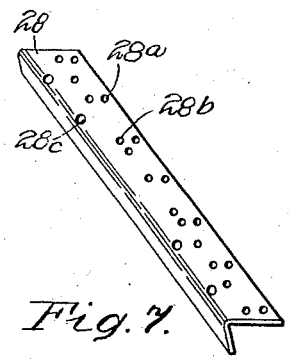

Figs. 1 and 2 are respectively opposite faces of the tine-bearing head of one of my toothed implements, with the handle broken away. Fig. 3 is a fragmental side elevation of the said head on an enlarged scale. Figs. 4 and 5 are respectively opposite faces of plans of a modified type of tine-bearing head, with the handle broken away, adapted for use as a hand cultivator. Fig. 6 is a fragmental side elevation of the same, and Fig. 7 is a detail perspective view of the slidable tine adjusting bar for the latter device.

My invention is not restricted to the precise construction and arrangement of parts herein shown and described, nor to the various details thereof, as the same may be modified or rearranged in various particulars without departing from the spirit and scope of my invention, practical embodiments of which have been herein illustrated and described without attempting to show all of the various forms and modifications in which my invention might be embodied.

The device illustrated in Figs. 1 to 3 inclusive pertains particularly to lawn brooms having adjustably mounted and separately detachable elastic teeth or tines.

The numeral 1 denotes a handle having at one end a medial longitudinal kerf 16. The numeral 3 denotes an elongated supporting device or plate whose forward marginal part 2 is re-curved and supplied in its part 2 with a row of elongated holes 4 and along its bend with another row of holes, the latter seating the bent terminals 5 of straight terminally curved tines 6. The web 3 of said cross member 2—3 has a medial hole to receive a headed bolt 20 which also traverses an alined hole in the handle 1 and is secured by a nut 21, using washers 22. The part 3 has several longitudinally alined holes 7.

The numeral 10 denotes a channel bar having in its lower member a longitudinal row of transverse slots 11 which receive said tines 6 slidably. These slots 11 are spaced more widely than the holes 4 to hold the tines divergently. The rows of slots may be spaced alike, or less widely in the bar 10, for sweeping fallen acorns, or for gathering finely cut grass, and permit free springing of the tines.

Referring to Figs. 2 and 3, 14 denotes a plate soldered along one face of the part 3 and has its forward margin bent at less than a right angle to provide a member 15 which has a row of holes 23 to receive parts of U-shaped rods 13 which are preferably of larger diameter than the tines 6. The rods 13 are curved appropriately to be nested together in the same plane medially in the root of the kerf 16 and secured there by a bolt 17, with washers 19 and a nut 18. The rods 13 diverge and traverse holes 12 in the upper member of the bar 10 loosely, the terminal parts of the outermost rods being crimped to releasably secure the bar 10 thereon in adjusted positions across them transversely. The rods 13 are parallel to the tines 6 and are evenly spaced apart to permit the bar 10 to be moved longitudinally thereover.

The numeral 9 denotes a pair of connecting rods with oppositely bent terminals at their opposite ends, of which the forward terminals enter holes 24 in the upper member of the channel bar 10, and a larger number of holes 24 are provided than said rods 9 to permit the rods 9 to be adjusted in separation.

The rear bent terminals 8 of the rods 9 after traversal of certain ones of the holes 7 in the overlapped plate members 3 and 14, are bent over upon the plate 3. The rods 9 may be inserted in any of the holes 7 to adjustably space them apart. The parts of the rods 9 adjacent the plates 3—14 are curved to position said rods 9 parallel to the rods 13 and tines 6. The rods 9 diverge from each other and serve to connect the channel bar 10 to the supporting device 3 adjustably.

As the rods 9 and 13 and the tines 6 are parallel, the channel bar 10 may be moved to and fro along all of the tines 6, the rods 13 affording a support for the channel bar, and the latter adjusting the spacing of the tines as desired. By changing the terminals of the connecting-rods 9 to other holes alined in the channel bar 10 and the plates 3—14, the outward movement of the channel bar is variably limited, while the tines are kept in one plane.

In order to detachably lock the tines 6 to the supporting device 3—2, a transversely positioned locking bar 25—26 is inserted slidably between the rods 13 and the tines 6 abutting upon the forward face of the flange 15. The locking bar is an elongated elastic plate bent medially longitudinally at an acute angle to provide the narrowly separated members 25 and 26 which thus may by compression elastically yield toward each other as inserted between said rods and tines transversely. As shown in Fig. 3, the upper longitudinal edge of the locking bar part 25 engages the rods 13 at their places of engagement with the flange 15 angularly, while the marginal edge of the part 26 is bent or upset at 27 to seat engagingly between the angles of the flange 15 and the tines 6 abutting the plate 3. As the parts 25 and 26 are under elastic compression, the bar when inserted locks the tines 6 in place. When a tine 6 is broken or it is desired to remove one or more of them, the locking bar 25—26 may be shifted transversely as far as necessary, to permit removal of one or more tines thus released, and the insertion of one or more others.

It will be noticed that the upset margin 27 of the locking bar is so engaged between the angles of the tines and the angle of the flanged plate 14—15, that the locking bar cannot be displaced longitudinally of the tines 6 while the latter are stressed in use.

It will also be observed, that the tines 6 are positioned at a small angle with and below the handle 1, whereby the tines may contact with the soil, or surface of a lawn, at a sufficient angle in use while the handle is held at a convenient position for raking or sweeping cut grass or other material, the elastic tines yielding to avoid and pass around any fixed obstructions, or to thus be prevented from tearing out pieces of sod. The shifting of the channel bar 10 varies the spacing of the tines 6, so that the broom may be thus accommodated in its width and the operation of its tines to any desired use therefor.

I have illustrated in Figs. 4 to 7 inclusive, a modification of my invention, wherein the device is constructed to be suitable as a hand cultivator. A modified supporting device 3ª consists of a plate bent longitudinally as shown in Fig 6 and medially to provide a closed tubular seat 3ᵇ for a locking rod 25ª which is slidably mounted therein. The plate 3ª is again bent longitudinally to provide a flanged part 2ª arranged at a right angle to the part 3ª and having a row of longitudinally alined holes to receive the upturned terminals 5ª of tines 6 which latter have recurved prongs 6ª at their outer or forward ends. The tines 6 are bent upwardly to traverse notches 3ᶜ in the tubular part 3ᵇ with the locking rod 25ª inclosing them in the notches. The tines are preferably alternated in different lengths with the shorter tines positioned at a different level as to angle with the handle 1 than the alternated longer tines, so that in use the shorter tines bring their prongs 6ª into contact with the soil in breaking it before the following prongs of the longer tines. This arrangement of the tines also is useful as causing all the tines to contact with the soil at the same level when the handle is held at a convenient working angle relative to the soil. The web of the plate 3ª is secured in the kerf 16 of the handle 1 by a bolt 20 and nut 21 like those shown in Figs. 1 and 2. Like U-shaped rods 13 are secured in the kerf 16 by a like bolt 17 and nut 18. An adjusting angle bar 28 has a number of longitudinally alined holes 28ª and 28ᵇ to receive the alternated longer and shorter tines 6, the number of holes in each case being greater than the number of tines to permit of changing the tines in different spacings in their divergency. The angle bar 28 also has near its longitudinal angle a number of holes 28ᶜ to receive the rods 13. The angle bar 28 is used as before described in varyingly spacing the tines 6 as desired, the rod end parts 13 being positioned parallel to the planes in which the alternated tines are located. The locking-rod 25ª may be moved endwise to release one or more tines to be replaced by others, or left out. In order to permit of the convenient moving of the locking rod 25ª, the rod is bent downwardly at 25ᵇ then bent reversely at 25ᶜ, then terminally slightly hooked at 25ᵈ to clip one of the rods 13, thus locking the rod 25ª in place. The loop thus provided on the rod 25ª is convenient as a fingerhold in shifting the rod to and fro in the tubular part 3ᵇ.

The rods 13 may be mounted upon the handle 1 in any suitable manner for effectively supporting either of the cross bars 10 or 28. The locking device 25 may also be varied to hold the tines securely when mounted according to the arrangement of the tines for different uses.

Having described my invention, what I claim as new, and desire to secure by Letters Patent, is:

1. In an implement of the character described, a handle, a cross member medially secured thereon and having longitudinal flanges on opposite faces, spaced elastic tines terminally removably connected to one flange to project forwardly, engaging devices connected to the other flange, and an elongated locking element slidably engaged between said engaging devices the other flange, and said tines, to lock said element releasably and slidably therewith to retain itself and said tines removably in interlocked positions.

2. In an implement of the character described, a handle, a cross member medially secured thereon and having longitudinal flanges, spaced elastic tines terminally removably connected to one flange to project forwardly engaging devices connected to the other flange, an elongated locking element removably interlocked between and with said engaging devices, the other flange and tines, said element being longitudinally crimped and elastic to interlock with both the said engaging devices and tines when under compression, and slidably removable to permit of the detaching of one or more tines.

3. In an implement of the character described, a handle, a supporting device secured on one end thereof, elastic tines terminally removably connected to the supporting device, and an elastic locking bar of angular cross section tensionally engaged between the supporting device and tines and removable endwise, to lock the tines to the supporting device.

4. In an implement of the character described, a handle, a cross-member medially mounted on said handle and having oppositely directed longitudinal flanges on opposite faces, tines terminally connected to one flange of said cross-member loosely, elastic rods fixed on said handle, means for adjustably connecting said rods to said tines, and a locking-device mounted slidably on said cross-member and engaging said tines and rods to lock it detachably thereto.

5. In an implement of the character described, a handle, an elongated supporting device mounted across the lower end of said handle, rods mounted upon the handle and supporting device to project forwardly therefrom, divergent elastic tines detachably connected to said supporting device and positioned to project forwardly therefrom in parallel with said rods, an elongated spacing element mounted slidably upon and across said rods and tines and movable therealong to vary the spacing of the tines transversely, and devices connected to said handle and engaged loosely with said supporting device and also connected adjustably to said spacing element to support the spacing element and the tines in any relatively adjusted positions.

6. In an implement of the character described, a handle, a cross member secured on its lower part, spaced elastic tines terminally connected to said cross member to project forwardly, supporting rods also connected to said implement in a parallel plane to said tines with the outer rods transversely crimped, and a transverse spacing member loosely slidably mounted on said tines and rods for adjustments longitudinally therealong and to be releasably held in adjusted positions by the crimps upon said outer rods.

7. In an implement of the character described, a handle, an elongated supporting device mounted medially across the lower end of said handle rigidly, divergent elastic tines having angularly bent terminals connected detachably to said supporting device, rods connected to said handle and to said supporting device and projecting in parallel above said tines, a channel bar having transversely spaced apertures therealong to loosely receive therethrough said rods and tines for adjustment of the channel bar lengthwise therealong, said channel-bar also having apertures therealong above the last-mentioned apertures, and connecting-rods swingingly connected divergently to said supporting device and traversing the last-mentioned apertures of said channel bar adjustably.

8. In an implement of the character described, an elongated supporting member, elastic tines supported upon the lower end part of said member, means connected yieldingly elastically and adjustably between said member and said tines to support the tines intermediate their length in any variable spacing thereof, and means for releasably locking said tines to said supporting member.

In testimony whereof I affix my signature.

DANIEL H. YOUNG.